United States Patent
Pugel (10) Patent No.: US 7,714,715 B2
(45) Date of Patent: May 11, 2010

(54) APPARATUS AND METHOD FOR RECEIVING EMERGENCY ALERT SIGNALS

(75) Inventor: Michael Anthony Pugel, Noblesville, IN (US)

(73) Assignee: Thomson Licensing, Boulogne Billancourt (FR)

( * ) Notice: Subject to any disclaimer, the term of this patent is extended or adjusted under 35 U.S.C. 154(b) by 779 days.

(21) Appl. No.: 10/535,115

(22) PCT Filed: Oct. 15, 2003

(86) PCT No.: PCT/US03/32600

§ 371 (c)(1),
(2), (4) Date: May 16, 2005

(87) PCT Pub. No.: WO2004/047429

PCT Pub. Date: Jun. 3, 2004

(65) Prior Publication Data

US 2006/0055527 A1    Mar. 16, 2006

Related U.S. Application Data

(60) Provisional application No. 60/426,641, filed on Nov. 15, 2002, provisional application No. 60/426,642, filed on Nov. 15, 2002, provisional application No. 60/426,643, filed on Nov. 15, 2002.

(51) Int. Cl.
*G08B 1/08* (2006.01)
(52) U.S. Cl. .................. 340/539.28; 340/288; 340/506; 340/3.1; 348/E7.049

(58) Field of Classification Search ................. 340/288, 340/539.28, 506, 3.1; 725/33; 348/E7.049, 348/E7.07; 455/526
See application file for complete search history.

(56) References Cited

U.S. PATENT DOCUMENTS

| 3,796,829 | A | * | 3/1974 | Gray ........................... 725/82 |
| 3,886,538 | A | * | 5/1975 | Takeuchi ............... 340/538.12 |
| 3,993,955 | A | * | 11/1976 | Belcher et al. ................. 725/33 |
| 5,760,820 | A |  | 6/1998 | Eda et al. |
| 2002/0162121 | A1 |  | 10/2002 | Mitchell |

FOREIGN PATENT DOCUMENTS

| JP | 62-064132 A | 3/1987 |
| JP | 8-223557 A | 8/1996 |
| JP | 11-196342 A | 7/1999 |
| JP | 2000-295588 A | 10/2000 |
| JP | 2001-211441 A | 8/2001 |

(Continued)

OTHER PUBLICATIONS

Search Report Dated Mar. 19, 2004.

*Primary Examiner*—Daryl Pope
(74) *Attorney, Agent, or Firm*—Robert D. Shedd; Joseph J. Opalach; Brian J. Cromarty (57) ABSTRACT

An apparatus such as a television signal receiver provides an emergency alert function, according to an exemplary embodiment, the television signal receiver includes a first tuner for tuning a first channel when the television signal receiver is in an on mode. A second tuner is provided for tuning a second channel when the television signal receiver is in the on mode and an off/standby mode. The second channel provides emergency alert signals capable of activating the emergency alert function.

14 Claims, 5 Drawing Sheets

FOREIGN PATENT DOCUMENTS

| | | |
|---|---|---|
| WO | WO 99/55090 | 10/1999 |
| WO | WO 01/33853 | 5/2001 |
| WO | WO 01/45386 | 6/2001 |
| WO | WO 01/50739 | 7/2001 |
| WO | WO 03/096693 | 11/2003 |

* cited by examiner

APPARATUS AND METHOD FOR RECEIVING EMERGENCY ALERT SIGNALS

This application claims the benefit, under 35 U.S.C. § 365 of International Application PCT/US03/32600, filed Oct. 15, 2003, which was published in accordance with PCT Article 21(2) on Jun. 3, 2004 in English and which claims the benefit of U.S. provisional patent application No. 60/426,641, filed Nov. 15, 2002; U.S. provisional patent application No. 60/426,642, filed Nov. 15, 2002 and U.S. provisional patent application No. 60/426,643, filed Nov. 15, 2002.

The present invention generally relates to apparatuses such as a television signal receiver and/or modem which provide an emergency alert function, and more particularly, to techniques for receiving emergency alert signals using such apparatuses.

Emergency events such as severe weather, natural disasters, fires, civil emergencies, war acts, toxic chemical spills, radiation leaks, or other such conditions can be devastating to unprepared individuals. With weather-related emergencies, authorities such as the National Weather Service (NWS) and the National Oceanographic and Atmospheric Administration (NOAA) are generally able to detect severe weather conditions prior to the general public. Through the use of modem weather detection devices, such as Doppler radar and weather satellites, the NWS and NOAA are able to issue early warnings of severe weather conditions which have saved many lives. However, for such warnings to be effective, they must be communicated to their intended recipients.

With certain apparatuses such as television signal receivers, warnings for emergency events may be provided when the receiver is tuned to a particular channel which provides such warnings. For example, in any given geographical area, certain local channels may provide information regarding emergency events affecting that geographical area. However, if a viewer is not tuned to such a local channel when an emergency event occurs, the viewer may not be notified of the emergency event, and may therefore be placed in a potentially dangerous situation.

Accordingly, there is a need for an apparatus and method for providing notification of emergency events which avoids the foregoing problems, and thereby increases the likelihood that users are promptly notified of emergency events. The present invention addresses these and other issues.

In accordance with an aspect of the present invention, a television signal receiver having an emergency alert function is disclosed. According to an exemplary embodiment, the television signal receiver comprises first tuning means for tuning a first channel when the television signal receiver is in an on mode. Second tuning means are provided for tuning a second channel when the television signal receiver is in the on mode and an off/standby mode. The second channel provides emergency alert signals capable of activating the emergency alert function.

In accordance with another aspect of the present invention, a method for controlling a television signal receiver having an emergency alert function is disclosed. According to an exemplary embodiment, the method comprises steps of enabling a first tuner to tune a first channel when the television signal receiver is in an on mode, and enabling a second tuner to tune a second channel when the television signal receiver is in the on mode and an off/standby mode. The second channel provides emergency alert signals capable of activating the emergency alert function.

In accordance with still another aspect of the present invention, a modem apparatus having an emergency alert function is disclosed. According to an exemplary embodiment, the modem apparatus comprises a modulator operative to modulate upstream signals provided to a network. A demodulator is operative to demodulate downstream signals provided from the network. The downstream signals include emergency alert signals capable of activating the emergency alert function. An alert system is operative to provide an alert output when the emergency alert function is activated.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
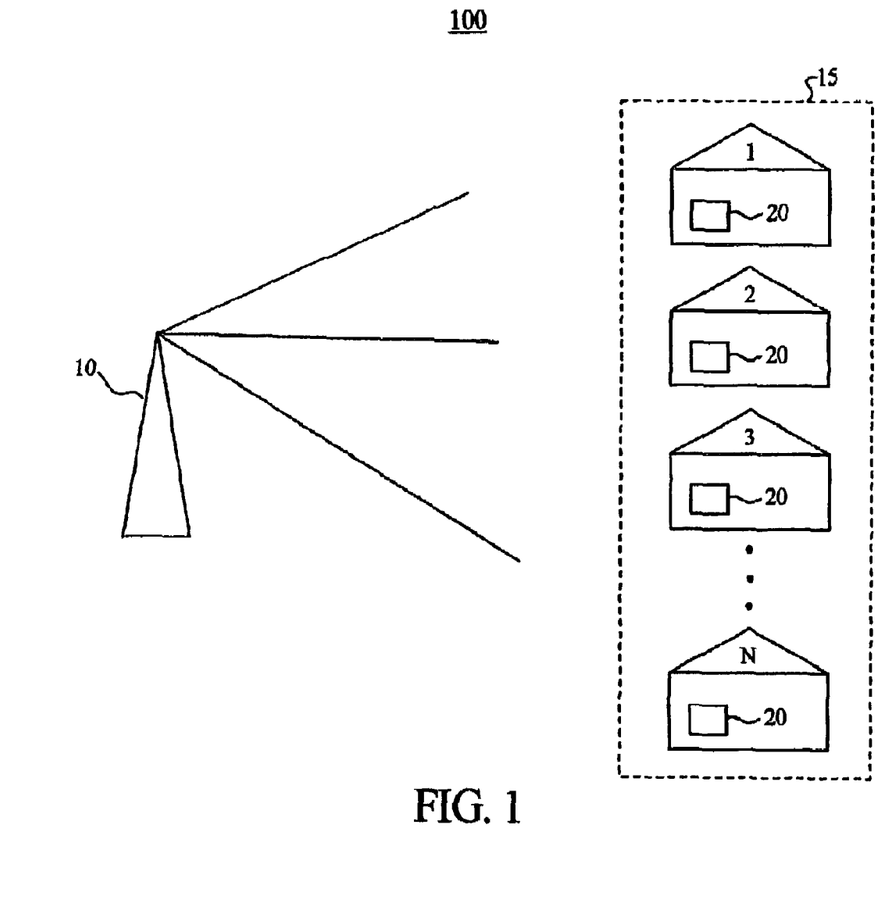
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises signal transmission means such as signal transmission source 10, dwelling means such as dwelling units 15 (i.e., 1, 2, 3 . . . N, where N may be any positive integer), and signal receiving means such as television signal receivers 20.

In FIG. 1, dwelling units 15 may represent residences, businesses and/or other dwelling places located within a particular geographical area, such as but not limited to, a particular continent, country, region, state, area code, zip code, city, county, municipality, subdivision, and/or other definable geographical area. According to an exemplary embodiment, each of the dwelling units 15 is equipped with at least one television signal receiver 20 having an emergency alert function. According to the present invention, the emergency alert function enables television signal receiver 20 to receive emergency alert signals and provide one or more alert outputs to notify individuals of an emergency event.

As will be discussed later herein, television signal receiver 20 is also capable of, among other things, receiving emergency alert signals from a separate channel which ensures that emergency events can be detected during all operational modes of television signal receiver 20, namely an on mode and an off/standby mode. According to an exemplary embodiment, the on mode is an operational mode where television signal receiver 20 is turned on (i.e., providing audio and/or video outputs), while the off/standby mode is an operational mode where television signal receiver 20 is turned off (i.e., no audio and/or video outputs) but still receives electrical power. Television signal receiver 20 may for example be switched from the off/standby mode to the on mode responsive to a user input.

According to an exemplary embodiment, signal transmission source 10 transmits signals including emergency alert signals which may be received by each television signal receiver 20. The emergency alert signals may be provided from an authority such as the NWS, or other authorities such as governmental entities or the like. Signal transmission source 10 may transmit the emergency alert signals in their original form as provided by the authority, or may append digital data representative of the emergency alert signals to other data, or may modify the emergency alert signals in some manner appropriate for its specific transmission format needs. In response to the emergency alert signals, each television signal receiver 20 may provide one or more alert outputs to thereby notify individuals of the emergency event. Signal transmission source 10 may transmit such emergency alert signals to television signal receivers 20 via any wired or wireless link such as, terrestrial, cable, satellite, fiber optic, digital subscriber line (DSL), and/or any other type of broadcast and/or multicast means.

Figure 2:
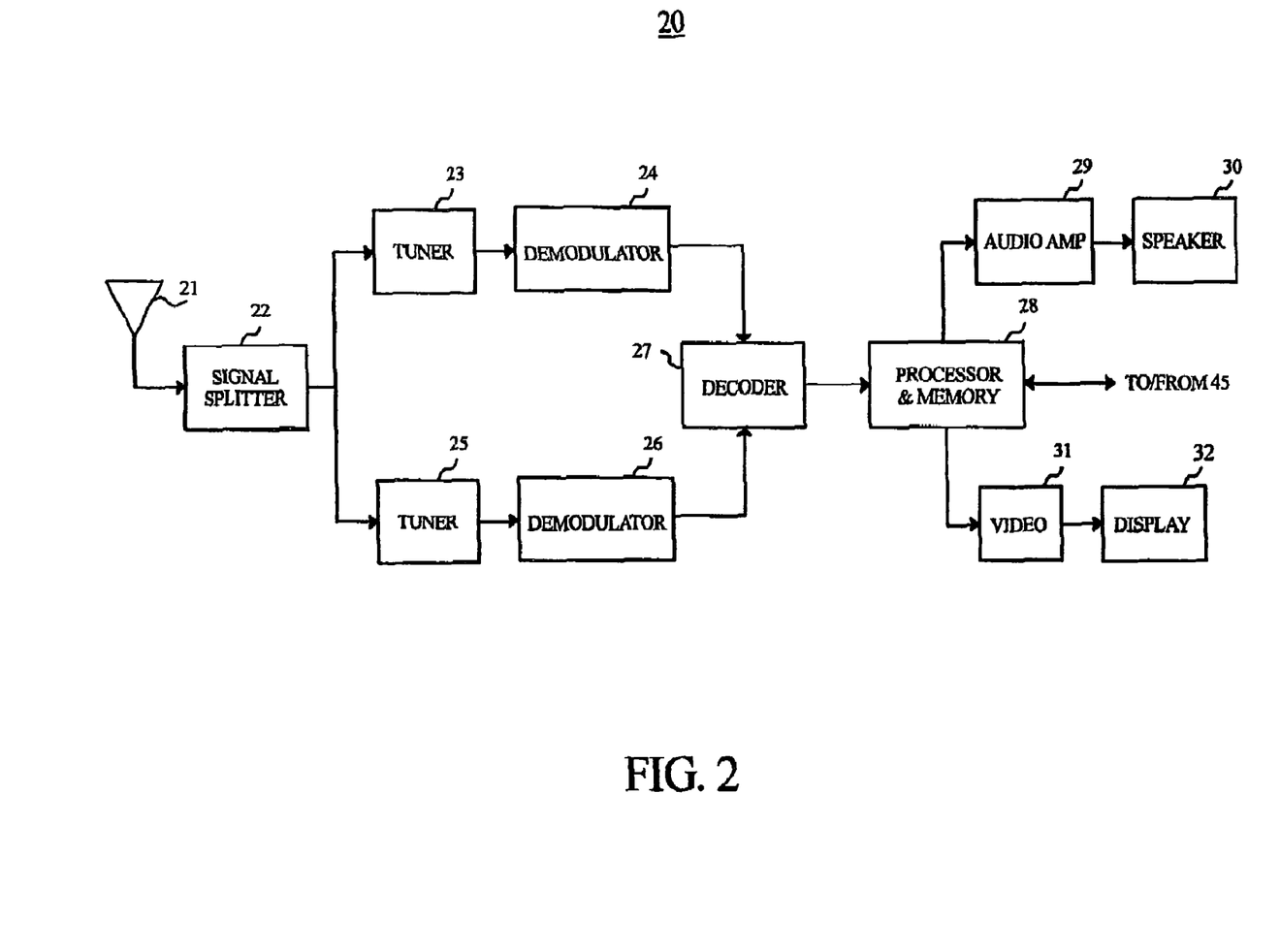
FIG. 2 is a block diagram of a television signal receiver according to an exemplary embodiment of the present invention.

Referring to FIG. 2, a block diagram of an exemplary embodiment of television signal receiver 20 of FIG. 1 is shown. In FIG. 2, television signal receiver 20 comprises signal receiving means such as signal receiving element 21, signal splitting means such as signal splitter 22, first tuning means such as tuner 23, first demodulation means such as demodulator 24, second tuning means such as second tuner 25, second demodulation means such as demodulator 26, decoding means such as decoder 27, processing means and memory means such as processor and memory 28, audio amplification means such as audio amplifier 29, audio output means such as speaker 30, video processing means such as video processor 31, and visual output means such as display 32. Some of the foregoing elements may for example be embodied using integrated circuits (ICs). For clarity of description, certain conventional elements of television signal receiver 20 including control signals may not be shown in FIG. 2. According to an exemplary embodiment, television signal receiver 20 may receive and process signals in analog and/or digital formats.

Signal receiving element 21 is operative to receive signals including audio, video and/or emergency alert signals from signal sources, such as signal transmission source 10 in FIG. 1. According to an exemplary embodiment, emergency alert signals may be received as separate data packets in a digital transmission system. According to another exemplary embodiment, received signals may include digitally encoded emergency alert signals. Signal receiving element 21 may be embodied as any signal receiving element such as an antenna, input terminal or other element.

Signal splitter 22 is operative to split the signals provided from signal receiving element 21 into first and second frequency channels. According to an exemplary embodiment, television signal receiver 20 may include a picture-in-picture (PIP) function wherein the first channel includes audio and/or video signals for a main picture, and the second channel includes audio and/or video signals for the PIP function.

Tuner 23 is operative to tune signals including audio, video and/or emergency alert signals in the first channel when television signal receiver 20 is in the on mode. Accordingly, tuner 23 may tune signals for the main picture of television signal receiver 20. Demodulator 24 is operative to demodulate signals provided from tuner 23, and may demodulate signals in analog and/or digital transmission formats.

Tuner 25 is operative to tune signals including audio, video and/or emergency alert signals in the second channel when television signal receiver 20 is in the on mode. Accordingly, tuner 25 may tune signals for the PIP function of television signal receiver 20. Additionally, tuner 25 is operative to tune signals including emergency alert signals in the second channel when television signal receiver 20 is in the off/standby mode. In this manner, tuner 25 enables television signal receiver 20 to receive emergency alert signals in both the on mode, and the off/standby mode. Demodulator 26 is operative to demodulate signals provided from tuner 25, and may demodulate signals in analog and/or digital transmission formats.

Decoder 27 is operative to decode signals including audio, video and/or emergency alert signals provided from demodulators 24 and 26. According to an exemplary embodiment, decoder 27 decodes digital data which represents emergency alert signals indicating an emergency event. Decoder 27 may also perform other decoding functions, such as decoding data which represents emergency alert signals included in the vertical blanking interval (VBI) of an analog television signal. According to an exemplary embodiment, the emergency alert signals include data comprising Specific Area Message Encoding (SAME) data associated with the emergency event. SAME data comprises a digital code representing information such as the specific geographical area affected by the emergency event, the type of emergency event (e.g., tornado watch, radiological hazard warning, civil emergency, etc.), and the expiration time of the event alert. SAME data is used by the NWS and other authorities to improve the specificity of emergency alerts and to decrease the frequency of false alerts. Other data and information may also be included in the emergency alert signals according to the present invention.

Processor and memory 28 are operative to perform various processing, control, and data storage functions of television signal receiver 20. According to an exemplary embodiment, processor 28 is operative to process the audio and video signals provided from decoder 27, and may for example perform analog processing, such as National Television Standards Committee (NTSC) signal processing and/or digital processing, such as Motion Picture Expert Group (MPEG) processing.

Processor 27 is also operative to receive the emergency alert signals from decoder 27 and determine whether the emergency alert function of television signal receiver 20 is activated based on data included in the emergency alert signals. According to an exemplary embodiment, processor 28 compares data in the emergency alert signals to user setup data stored in memory 28 to determine whether the emergency alert function is activated. As will be described later herein, a setup process for the emergency alert function of television signal receiver 20 allows a user to select items such as an applicable geographical area(s), and type(s) of emergency events (e.g., tornado watch, radiological hazard warning, civil emergency, etc.) which activate the emergency alert function.

When the emergency alert function of television signal receiver 20 is activated, processor 28 outputs one or more control signals which enable various operations. According to an exemplary embodiment, such control signals enable one or more alert outputs (e.g., aural and/or visual) to thereby notify individuals of the emergency event. Such control signals may also enable other operations of television signal receiver 20, such as causing it to be switched from the off/standby mode to the on mode. Further details regarding these aspects of the present invention will be provided later herein.

Audio amplifier 29 is operative to amplify the audio signals provided from processor 28. Such audio signals may for example represent audio content such as an NWS audio message, a warning alert tone and/or other audio content. Speaker 30 is operative to aurally output the amplified audio signals provided from audio amplifier 29.

Video processor 31 is operative to process the video signals provided from processor 28. According to an exemplary embodiment, such video signals may include embedded messages such as NWS text messages and/or other messages that provide details regarding emergency events. Video processor 31 may include closed caption circuitry which enables closed caption displays. Display 32 is operative to provide visual displays corresponding to processed signals provided from video processor 31. According to an exemplary embodiment, display 32 may provide visual displays including the aforementioned messages that provide details regarding emergency events.

Figure 3:
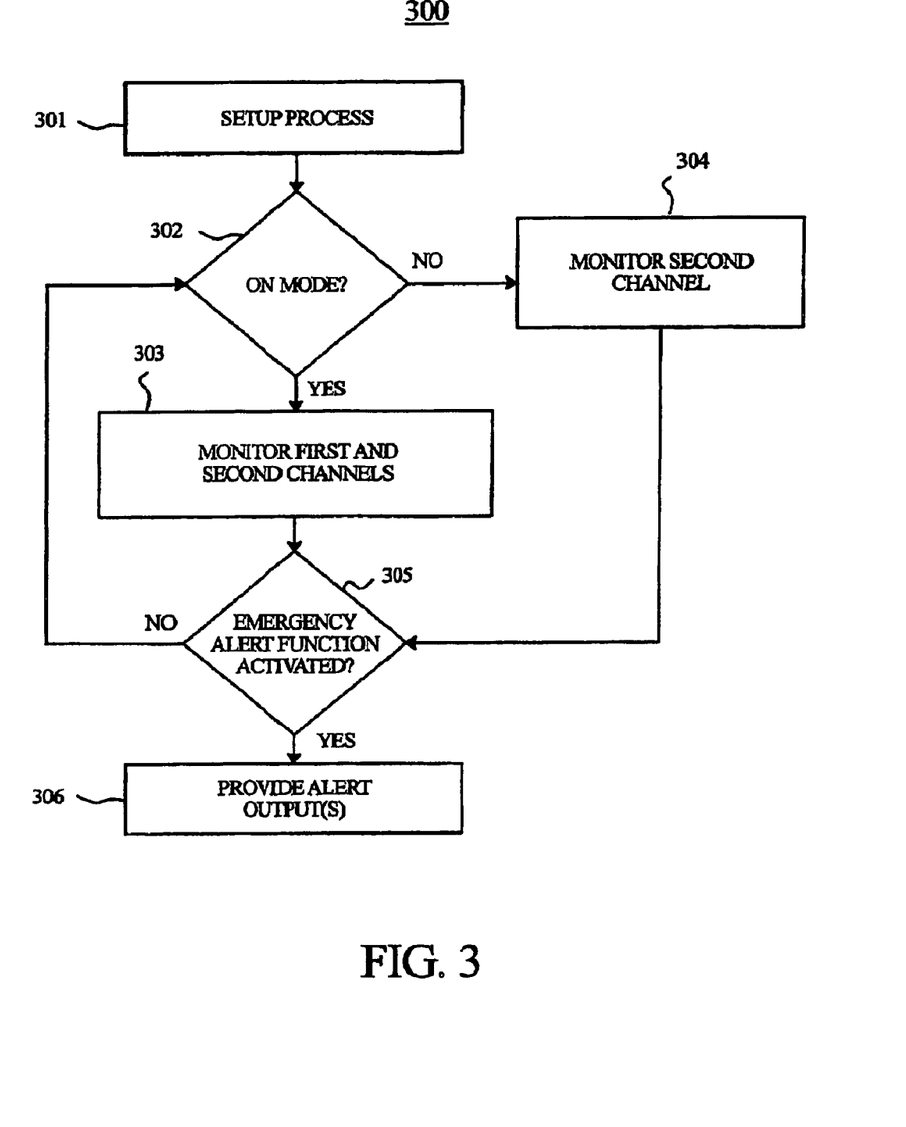
FIG. 3 is a flowchart illustrating steps according to an exemplary embodiment of the present invention.

Turning now to FIG. 3, a flowchart 300 illustrating exemplary steps according to the present invention is shown. For purposes of example and explanation, the steps of FIG. 3 will be described with reference to television signal receiver 20 of FIG. 2. The steps of FIG. 3 are merely exemplary, and are not intended to limit the present invention in any manner.

At step 301, a setup process for the emergency alert function of television signal receiver 20 is performed. According to an exemplary embodiment, a user performs this setup process by providing inputs to television signal receiver 20 (e.g., using a remote control device not shown) responsive to an on-screen menu displayed via display 32. Such an on-screen menu may for example be part of an electronic program guide (EPG) function of television signal receiver 20. According to an exemplary embodiment, the user may select at least the following items during the setup process at step 301:

A. Enable/Disable—The user may select whether to enable or disable the emergency alert function.

B. Frequency Selection—The user may select the monitoring channel to tune to in order to receive emergency alert signals. For example, the user may select a terrestrial, cable, satellite or other channel which will be monitored for emergency alert signals. The selection of a monitoring channel may for example be facilitated through a frequency scanning operation which scans various frequency channels to thereby identify the monitoring channels that provide the highest signal strength.

C. Geographical Areas—The user may select one or more geographical areas of interest. For example, the user may select a particular continent, country, region, state, area code, zip code, city, county, municipality, subdivision, and/or other definable geographical area. According to an exemplary embodiment, such geographical area(s) may be represented in memory 28 by location data, such as one or more Federal Information Processing Standard (FIPS) location codes.

D. Event Types—The user may select one or more types of emergency events which activate the emergency alert function. For example, the user may designate that events such as civil emergencies, radiological hazard warnings, and/or tornado warnings activate the emergency alert function, but that events such as a thunderstorm watch does not, etc. The user may also select whether the conventional warning audio tone provided by the NWS and/or other alert mechanism activates the emergency alert function. According to the present invention, different severity or alert levels (e.g., statement, watch, warning, etc.) may represent different "events." For example, a thunderstorm watch may be considered a different event from a thunderstorm warning.

E. Alert Outputs—The user may select one or more alert outputs to be provided when the emergency alert function is activated. According to an exemplary embodiment, the user may select visual and/or aural outputs to be provided for each type of emergency event that activates the emergency alert function. For example, the user may select to display a visual message (e.g., an NWS text message as a closed caption display) and/or tune television signal receiver 20 to a specific channel. The user may also for example select to aurally output a warning tone (e.g., chime, siren, etc.) and/or an audio message (e.g., NWS audio message), and the desired volume of each. Moreover, the alert outputs may be selected on an event-by-event basis. Other types of alert outputs may also be provided according to the present invention.

According to the present invention, other menu selections may also be provided at step 301 and/or some of the menu selections described above may be omitted. Data corresponding to the user's selections during the setup process of step 301 is stored in memory 28.

At step 302, a determination is made by processor 28 as to whether television signal receiver 20 is in the on mode. As previously indicated herein, the on mode is an operational mode where television signal receiver 20 is turned on (i.e., providing audio and/or video outputs), while the off/standby mode is an operational mode where television signal receiver 20 is turned off (i.e., no audio and/or video outputs) but still receives electrical power. Television signal receiver 20 may for example be switched from the off/standby mode to the on mode responsive to a user input.

If the determination at step 302 is positive, process flow advances to step 303 where television signal receiver 20 monitors the first and second channels for emergency alert signals using tuners 23 and 25, respectively, under the control of processor 28. According to an exemplary embodiment, the first channel monitored by tuner 23 provides a main picture and may be selected by a user through inputs to television signal receiver 20 as part of a normal channel selection process. Also according to this embodiment, the second channel monitored by tuner 25 may be selected by the user during the setup process of step 301 (i.e., item B). Since tuner 25 may enable a PIP function of television signal receiver 20, the use of tuner 25 to monitor the second channel at step 303 may be conditioned on the PIP function being turned off. Accordingly, assuming the PIP function is turned off and tuner 25 is available, tuners 23 and 25 monitor the first and second channels, respectively, at step 303 and one of the tuners 23 and 25 may thereby receive incoming emergency alert signals.

If the determination at step 302 is negative, television signal receiver 20 is deemed to be in the off/standby mode and process flow advances to step 304 where tuner 25 monitors the second channel under the control of processor 28 and may thereby receive incoming emergency alert signals.

At step 305, a determination is made as to whether the emergency alert function of television signal receiver 20 is activated. According to an exemplary embodiment, processor 28 makes this determination by comparing data included in the incoming emergency alert signals to data stored in memory 28. As previously indicated herein, the emergency alert signals may include data such as SAME data which represents information including the type of emergency event (e.g., tornado watch, radiological hazard warning, civil emergency, etc.) and the specific geographical area(s) affected by the emergency event. According to an exemplary embodiment, processor 28 compares this SAME data to corresponding user setup data (i.e., items C and D of step 301) stored in memory 28 to thereby determine whether the emergency alert function is activated. In this manner, the emergency alert function of television signal receiver 20 is activated when the emergency event indicated by the emergency alert signals corresponds to: (1) the geographical area(s) selected by the user for item C of step 301 and (2) the event type(s) selected by the user for item D of step 301.

If the determination at step 305 is negative, process flow loops back to step 302 where processor 28 determines whether television signal receiver 20 is in the on mode. Alternatively, if the determination at step 305 is positive, process flow advances to step 306 where television signal receiver 20 provides one or more alert outputs to thereby notify individuals of the emergency event.

According to an exemplary embodiment, processor 28 enables the one or more alert outputs at step 306 in accordance with the user's selections during the setup process of step 301 (i.e., item E), and such alert outputs may be aural and/or visual in nature. For example, aural outputs such as a warning tone and/or an NWS audio message may be provided at step 306 via speaker 30, and the volume of such aural outputs may be controlled in accordance with the volume level set by the user during the setup process of step 301. Visual outputs may also be provided at step 306 via display 32 to notify individuals of the emergency event. According to an exemplary embodiment, an auxiliary information display such as an NWS text message (e.g., as a closed caption display) and/or a video output from a specific channel may be provided at step 306 via display 32 under the control of processor 28. When an alert output results from emergency alert signals received via the second channel when television signal receiver 20 is in the on mode, processor 28 may enable a visual alert output (e.g., NWS text message, etc.) to be overlaid upon a visual output on display 32 provided via the first channel. If digital transmission is employed, the data packets received via the second channel may be inserted into the data stream from the first channel. This allows alert information (e.g., audio, video, text, etc.) from the second channel to simply replace information from the first channel. In this manner, normal programming provided via the first channel may be interrupted or augmented to provide the alert output and thereby ensure that users are notified of an emergency event.

According to another exemplary embodiment, the alert output(s) provided at step 306 may be based on the severity or alert level of the particular emergency event. For example, emergency events may be classified in one of three different alert level categories, such as statement, watch, and warning. With such a classification scheme, the alert output for an emergency event at a level 1 or statement level may be provided by an unobtrusive notification means such as a blinking light emitting diode (LED) since it is the least severe type of emergency event. The alert output for an emergency event at a level 2 or watch level may have some type of audio component (e.g., radio message). The alert output for an emergency event at a level 3 or warning level may be provided by a siren or other type of alarm since it is the most severe type of emergency event. Other types of aural and/or visual alert outputs than those expressly described herein may also be provided at step 306 according to the present invention.

Figure 4:
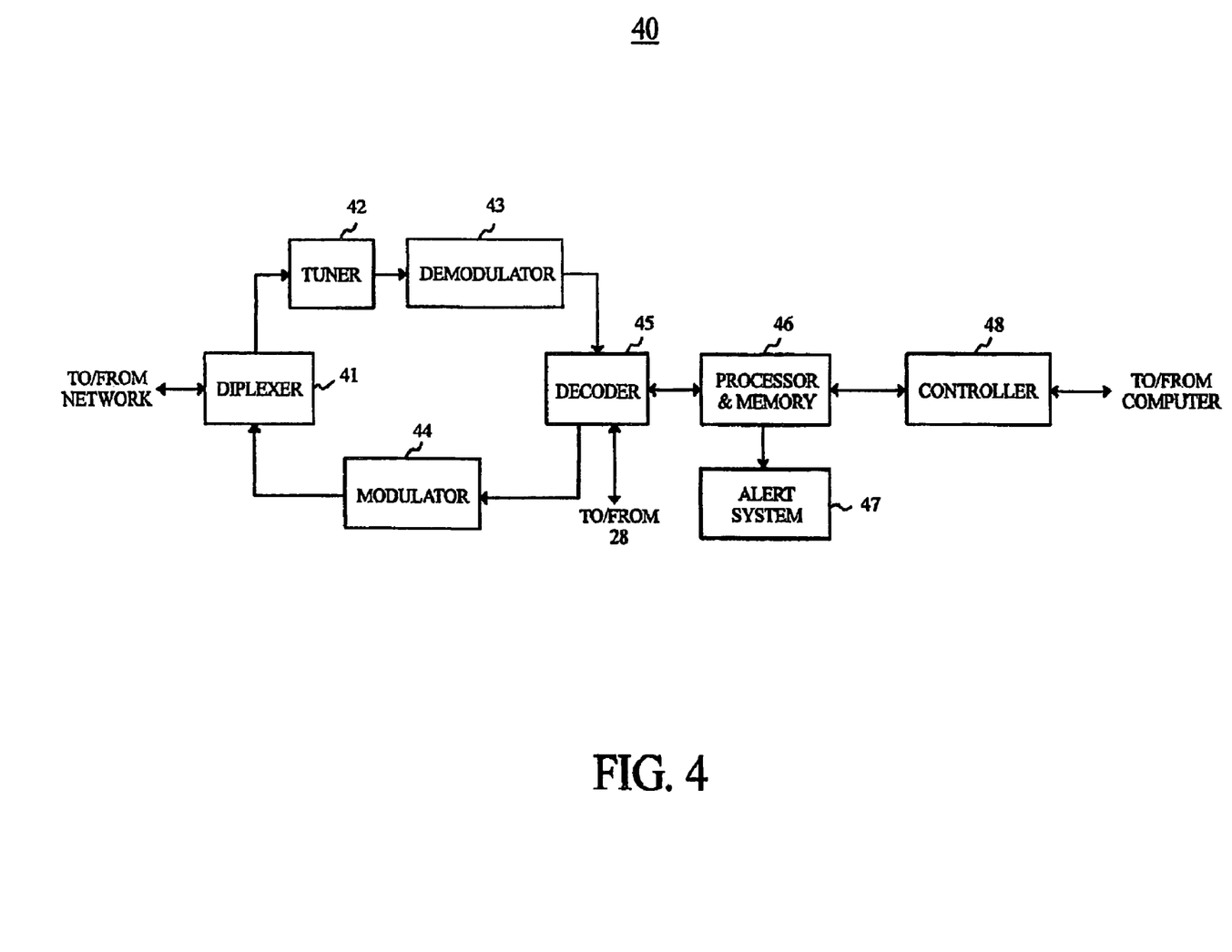
FIG. 4 is a block diagram of a modem apparatus according to an exemplary embodiment of the present invention.
Figure 5:
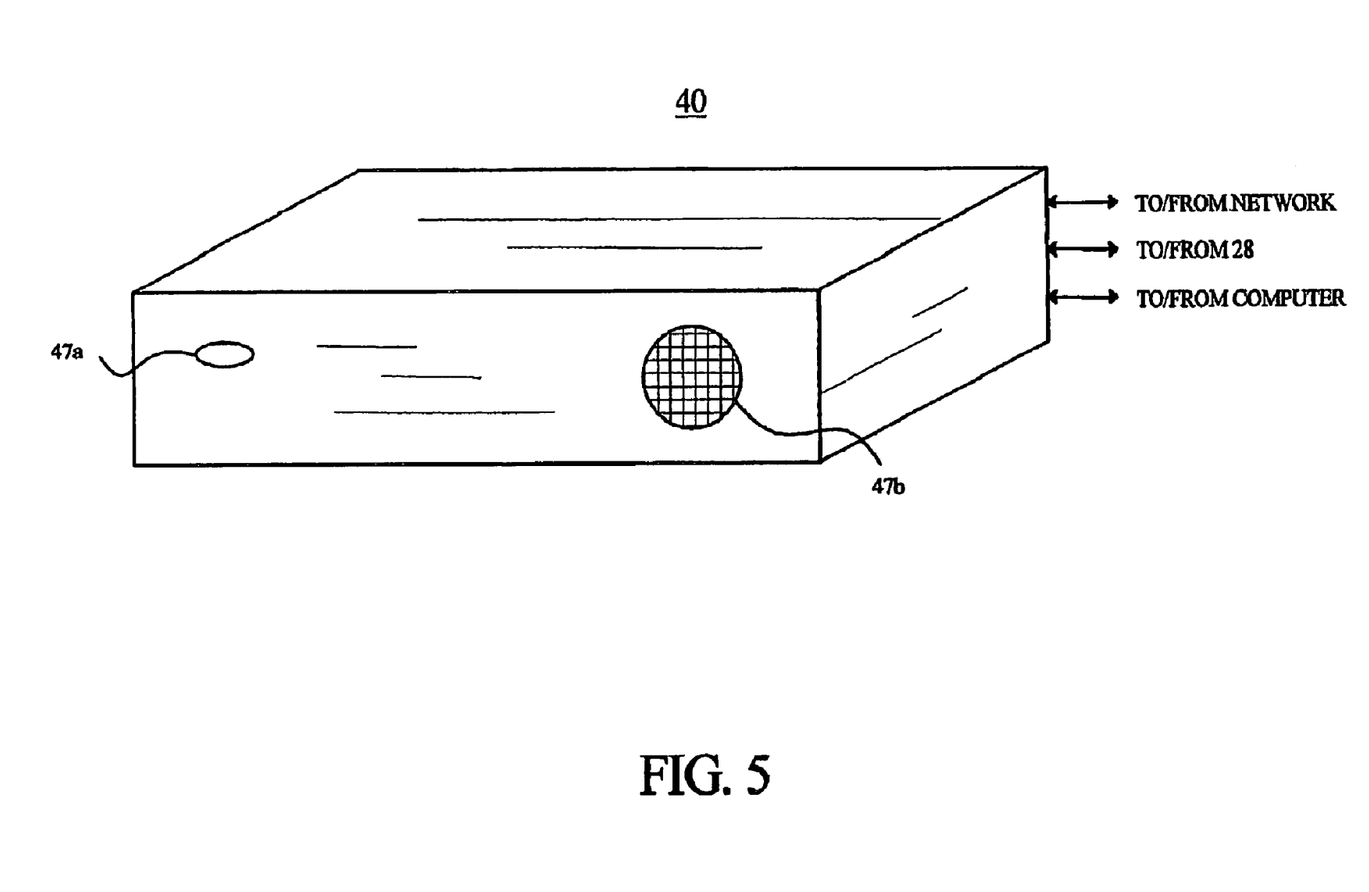
FIG. 5 is another diagram of a modem apparatus according to an exemplary embodiment of the present invention.

Referring now to FIG. 4, a block diagram of a modem apparatus 40 according to an exemplary embodiment of the present invention is shown. Modem apparatus 40 may for example be embodied as a cable modem and/or a DSL modem. According to an exemplary embodiment, modem apparatus 40 includes an emergency alert function which enables it to receive emergency alert signals and provide one or more alert outputs to notify individuals of an emergency event. According to this exemplary embodiment, modem apparatus 40 is a stand-alone device which may be operatively coupled to one or more external devices such as television signal receiver 20 and/or a computer which may each provide an emergency alert function. Accordingly, the emergency alert function of modem apparatus 40 may be separate and independent from the emergency alert functions of such other devices. In this manner, modem apparatus 40 may serve as the primary alerting device when such external devices are turned off. Moreover, the emergency alert function of modem apparatus 40 may be used in combination with the emergency alert functions of other devices such that modem apparatus 40 and the other devices each provide one or more alert outputs responsive to emergency alert signals, and thereby increase the likelihood that individuals are notified of emergency events. FIG. 5 is an exemplary diagram of modem apparatus 40 according to an exemplary embodiment of the present invention.

According to another exemplary embodiment, modem apparatus 40 may be combined with another device such that it is internal to the other device. For example, modem apparatus 40 may be included as internal circuitry within the chassis of television signal receiver 20, and thereby serve as a separate and independent monitoring device for emergency alert signals, either in substitution of, or in addition to, tuner 25.

In FIG. 4, modem apparatus 40 comprises signal diplexer means such as diplexer 41, tuning means such as tuner 42, demodulation means such as demodulator 43, modulation means such as modulator 44, decoding means such as decoder 45, processing means and memory means such as processor and memory 46, alert means such as alert system 47, control means such as controller 48. Some of the foregoing elements may for example be embodied using ICs. For clarity of description, certain conventional elements of modem apparatus 40 including control signals may not be shown in FIG. 4.

Diplexer 41 is operative to enable bi-directional transmission of signals between modem apparatus 40 and a network, such as a cable, satellite, fiber optic, DSL, terrestrial or other type of wired and/or wireless network. The signals received by modem apparatus 40 from the network may be referred to herein as downstream signals, and the signals transmitted to the network from modem apparatus 40 may be referred to herein as upstream signals. The downstream signals received by modem apparatus 40 may include emergency alert signals capable of activating the emergency alert function of cable modem 40 and/or another external device such as television signal receiver 20.

Tuner 42 is operative to tune the downstream signals received from the network via diplexer 41. Demodulator 43 is operative to demodulate the downstream signals provided from tuner 42. According to an exemplary embodiment, tuner 42 and demodulator 43 are operative to provide at least the same functionality as tuner 25 and demodulator 26 of television signal receiver 20, respectively, as previously described herein. Modulator 44 is operative to modulate the upstream signals provided to the network.

Decoder 45 is operative to provide at least the same functionality as decoder 27 of television signal receiver 20, as previously described herein. Accordingly, decoder 45 is operative to decode downstream signals that may include emergency alert signals. Such emergency alert signals may for example be represented as packets of digital data, or may be analog signals including digitally encoded signals. As indicated in FIG. 4, decoder 45 may be operatively coupled to processor 28 of television signal receiver 20 when modem apparatus 40 is combined with television signal receiver 20. If modem apparatus 40 is included as internal circuitry within television signal receiver 20, elements of FIG. 4 which are downstream of decoder 45, namely processor and memory 46, alert system 47, and controller 48, may be redundant.

Processor and memory 46 are operative to provide at least the same functionality as processor and memory 28 of television signal receiver 20, as previously described herein. Accordingly, processor and memory 46 may be programmed through a setup process such as the one described in step 301 of FIG. 3 to thereby establish user settings for the emergency alert function of modem apparatus 40. As previously indicated herein, the emergency alert function of modem apparatus 40 may be separate and independent from the emergency alert functions of connected devices such as television signal receiver 20. According to an exemplary embodiment, processor and memory 46 may be programmed via input means of modem apparatus 40 (not shown), from an external device (e.g., television signal receiver 20, computer, etc.), or via data provided from the network. Once programmed, processor 46 may compare data in received emergency alert signals to user setup data stored in memory 46 to determine whether the emergency alert function of modem apparatus 40 is activated. When the emergency alert function of modem apparatus 40 and/or another device is activated, processor 46 outputs one or more control signals which enable one or more alert outputs (e.g., aural and/or visual) to thereby notify individuals of the emergency event.

Alert system 47 is operative to provide one or more alert outputs under the control of processor 46 when the emergency alert function of modem apparatus 40 and/or another device is activated. According to an exemplary embodiment, alert system 47 includes visual and/or aural output means, such as visual output element 47a and aural output element 47b shown in FIG. 5. Visual output element 47a may for example be embodied as an LED and/or other type of visual indicator element. Aural output element 47b may for example be embodied as a speaker and/or other type of aural output element. Controller 48 is operative to control the transmission of signals to and from an external device, such as a computer. According to an exemplary embodiment, controller 48 may be embodied as an Ethernet or other type of controller. Accordingly, controller 48 may provide alert information to an external device (e.g., computer), or may provide direct inputs to audio and video processing circuitry of a device if modem apparatus 40 has been integrated into the device.

As described herein, the present invention provides techniques for receiving emergency alert signals using an apparatus such as a television signal receiver and/or modem. The present invention may be applicable to various apparatuses, either with or without a display device. Accordingly, the phrase "television signal receiver" as used herein may refer to systems or apparatuses capable of receiving and processing television signals including, but not limited to, television sets, or monitors that include a display device, and systems or apparatuses such as set-top boxes, video cassette recorders (VCRs), digital versatile disk (DVD) players, video game boxes, personal video recorders (PVRs), or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A television signal receiver having an emergency alert function, comprising:
    first tuning means for tuning first signals including video signals when said television signal receiver is in an on mode;
    second tuning means for tuning second signals including emergency alert signals when said television signal receiver is in one of said on mode and an off/standby mode; and
    wherein said emergency alert function is activated if said emergency alert signals indicate an emergency event corresponding to a user selected geographical area and a user selected event type.

2. The television signal receiver of claim 1, wherein said second tuning means is included in a modem apparatus.

3. The television signal receiver of claim 2, wherein said modem apparatus is internal to said television signal receiver.

4. The television signal receiver of claim 2, wherein said modem apparatus is external to said television signal receiver.

5. The television signal receiver of claim 4, wherein said modem apparatus includes alert means for providing an alert output when said emergency alert function is activated.

6. The television signal receiver of claim 5, wherein said alert means includes a visual output element.

7. The television signal receiver of claim 5, wherein said alert means includes an aural output element.

8. A method for controlling a television signal receiver having an emergency alert function, comprising: enabling a first tuner to tune first signals including
    video signals when said television signal receiver is in an on mode; enabling a second tuner to tune second signals including emergency alert signals
    when said television signal receiver is in one of said on mode and an off/standby mode; and
    wherein said emergency alert function is activated if said emergency alert signals indicate an emergency event corresponding to a user selected geographical area and a user selected event type.

9. The method of claim 8, wherein said second tuner is included in a modem apparatus.

10. The method of claim 9, wherein said modem apparatus is internal to said television signal receiver.

11. The method of claim 9, wherein said modem apparatus is external to said television signal receiver.

12. The method of claim 11, further comprised of providing an alert output via an alert system of said modem apparatus when said emergency alert function is activated.

13. The method of claim 12, wherein said alert output includes a visual output.

14. The method of claim 12, wherein said alert output includes an aural output.

* * * * *